United States Patent [19]

Lohman

[11] Patent Number: 4,570,573

[45] Date of Patent: Feb. 18, 1986

[54] COMPOSITION USEFUL AS A CAT LITTER, PLANT MULCH, OR GREASE AND OIL ABSORBENT

[75] Inventor: Donald J. Lohman, Cincinnati, Ohio

[73] Assignee: Cincinnati Fiber Inc., Cincinnati, Ohio

[21] Appl. No.: 662,190

[22] Filed: Oct. 18, 1984

[51] Int. Cl.$^4$ ............................................. A01K 1/015
[52] U.S. Cl. ....................................................... 119/1
[58] Field of Search ............................................. 119/1

[56] References Cited

U.S. PATENT DOCUMENTS

| | | | |
|---|---|---|---|
| 4,163,674 | 8/1979 | Been | 119/1 X |
| 4,278,047 | 7/1981 | Luca | 119/1 |
| 4,315,761 | 2/1982 | Larrson et al. | 119/1 X |

*Primary Examiner*—Hugh R. Chamblee
*Attorney, Agent, or Firm*—Frost & Jacobs

[57] ABSTRACT

A cat litter composition, which is absorbent, odorless, trackless and biodegradable, comprising about 60–94% by weight absorbent, about 1–35% by weight gypsum, and about 3–12% by weight water. The composition is pelletized so that it may easily be disposed of by flushing it down the toilet. This is particularly desirable when the composition is used as a cat litter.

7 Claims, No Drawings

COMPOSITION USEFUL AS A CAT LITTER, PLANT MULCH, OR GREASE AND OIL ABSORBENT

BACKGROUND OF THE INVENTION

1. Field of the Invention

The present invention relates to a novel composition which may primarily be employed for animal or cat litter, but can also be employed as plant mulch or a grease and oil absorbent.

2. Description of the Prior Art

Many cat litter compositions are available on the market which comprise an absorbent, a deodorant and sometimes a coloring agent and disinfectant agent. Absorbents such as clay, fuller's earth, cotton, wool, linen, paper, lime, diatomaceous earth, pumice, sand, wood chips, vermiculite, peat and alfalfa are employed for cat litter compositions. These absorbents typically comprise approximately 5–40% by weight of the cat litter. The following patents disclose a cat litter composition comprising gypsum and paper or other absorbents.

U.S. Pat. No. 4,090,470 to Williams teaches making deodorant by shaping and sizing an absorbent material to fit within a circular holder, and saturating the absorbent material with a deodorizing solution. One of the absorbent materials listed in the patent is paper. Another material which may also be employed, not as an absorbent, but as a carrier, is gypsum. The deodorant compositions are primarily either aluminum sulfate with a fragrance, or aluminum chloride with a fragrance.

The absorbent material saturated with the deodorant is positioned in a circular holder under the litter box for emitting deodorant vapors about the area surrounding the litter box.

This reference has several deficiencies in that the litter box is designed to employ a commercially available cat litter, in addition to the self-made deodorizer, thus yielding a product which is expensive and is not adaptable to other uses, like plant mulch.

U.S. Pat. No. 4,123,489 to Kelley teaches a method for pelletizing waste paper products, and mixing the pellets with portland cement and gypsum to form a light weight insulating concrete which can be cast or sprayed into place. This reference also describes the use of the pelletized paper, by itself, as a plant mulch or potting soil.

This patent is not employed as an animal or cat litter. Furthermore, the gypsum is not uniformly incorporated into the pelletized paper, but is merely employed as a coating or binder along with the portland cement to make a light weight cement.

U.S. Pat. No. 4,163,674 to Been teaches a process for making a synthetic liquid absorbent which may be employed for cat litter. Specifically, used newspaper is pulped with water and gypsum, dried and granulated. The composition contains 59 to 79% by weight hydrated gypsum in the form of plaster, 0.9% to 3.7% by weight paper and 29.5% to 37% by weight water.

This reference has several deficiencies including the fact that the composition is not pelletized. Furthermore, the composition contains a large amount of gypsum which is granulated into a powder which forms paw prints around the house by the animal user. Also, consumers prefer a product which is easily disposed of by flushing the toilet. With a high percentage of gypsum, the product is dense and practically unflushable, unless multiple flushes are employed.

U.S. Pat. No. 4,278,047 to Luca teaches an absorbent for animal excreta comprising vermiculite, gypsum and water, and optionally, a surfactant to aid in wetting the vermiculite and a disinfectant. After blending the above components with a composition, the composition is dried to drive off all the water. Thus, the primary components comprise vermiculite and gypsum while the optional components comprise disinfectant and surfactant. The final composition contains 40–66% by weight gypsum, 20–33% by weight vermiculite. The vermiculite can be replaced with some clay. Consequently, 0 to 33% by weight clay can be employed as a replacement for some of the vermiculite.

This reference also contains several deficiencies including the fact that the composition contains a large amount of gypsum which adheres to the user who leaves paw prints around the house. This characteristic is further aggravated by the vermiculite which is a very light weight material, and easily clings to the paws and fur of animals. Lastly, both vermiculite and gypsum are not biodegradable and therefore they do not easily break down at a sewage treatment plant.

Because of the various differences of the above products, there currently exists a need for an animal or cat litter which is odorless (and thus natural smelling to the animal user), trackless, biodegradable and flushable.

SUMMARY OF THE INVENTION

The present invention comprises a cat litter composition which is absorbent, odorless, dustfree, trackless, flushable and biodegradable. The ternary composition includes water, gypsum and an absorbent comprising paper and/or clay.

Although the primary use of the composition is intended as a cat litter, it can also be employed as a grease and oil absorbent, or plant mulch.

The present invention comprises a composition containing about 60–90% by weight absorbent, about 1–35% by weight gypsum and about 3–12% by weight water. Preferably the composition comprises about 80–94% by weight cellulose as an absorbent, about 1–7% by weight gypsum, and about 3–12% by weight water.

DESCRIPTION OF THE PREFERRED EMBODIMENT

The composition of the present invention is manufactured primarily with three ingredients: water, an absorbent comprising clay and/or cellulose, and gypsum. The water employed in the composition is generally tap water, but may be any source of water, so long as the water does not contain minerals or other elements which give an odor to the water. Furthermore, an excessively acidic water would chemically attack the cellulose, while an excessively basic water would irritate the dermis of the animal. Accordingly, the water should be neutral with a pH of about 7 to avoid the above drawbacks.

Gypsum is the naturally occurring mineral, $CaSO_4 \cdot 2H_2O$, which is primarily used in making plaster of Paris—$CaSO_4 \cdot \frac{1}{2}H_2O$, pigment for paint, or as a component in cement. Additionally, gypsum may be used in a plant mulch because it is slightly acidic and neutralizes alkaline soil, such as those containing alkali carbonates. Lastly, without wishing to limit the present invention to any specific theory, it is theorized that gypsum reacts with urea, which is the key component in urine, to form a urea sulfate salt. Thus, gypsum acts to prevent urea from breaking into its components, one of which is ammonia, so that when gypsum is employed in an animal litter composition, it prevents the typical urine-ammonia smell.

One of the most abundant and economical sources of cellulose is recycled paper. Paper has several desirable characteristics, such as being biodegradable, very absorbent, and capable of being easily disposed of by flushing it in a toilet.

The preferred composition is generally made by shredding old paper, such as newspaper, magazines, etc., grinding it into a powder, and adding sufficient water to pelletize the paper (generally about 3-12% by weight water) while simultaneously adding 1-7% by weight gypsum. The powdered paper, water and gypsum are mixed with substantial uniformity and then pelletized under high pressure as is known in the industry. The hardness of the pellets can be controlled to some extent by the thickness of the pellet die. The thicker the die, the harder the pellet; the thinner the die, the softer the pellet. If a thick die is employed, more pressure is required to pelletize the composition. If a thin die is employed, less pressure is required, but the pellet is soft and thus the pellet has a greater tendency to disintegrate into powder or dust. However, this can be minimized by employing a binder, such as soap, in the composition so that the soft pellets remain in pelletized form.

CAT LITTER

When the composition of the present invention is to be employed as a cat litter, either clay and/or paper can be used as the absorbent. The amount of clay or paper employed in the cat litter composition depends upon the amount of gypsum employed. Basically the composition includes an amount of gypsum with the balance being clay or paper, except that sufficient water is employed to assure adequate mixing and sufficient green strength to enable the composition to be pelletized. The amount of gypsum employed can range from 1-35% by weight. Using more than about 35% by weight gypsum causes the composition to easily break down during use, from pellet form to a fine powder. The powder is then spread throughout the home by the animal user. Using less than about 1% by weight gypsum is insufficient to adequately react with the urine to neutralize the odor.

The preferred composition contains about 1-7% by weight gypsum. This is the preferred range because it has been discovered that this amount of gypsum is sufficient to neutralize the odor when the absorbent is spent. Cellulose is the preferred absorbent, and in particular, paper is the preferred cellulose because it is more economical and appears capable of absorbing more animal waste.

The above composition may be employed as cat litter by pouring the pelletized composition into a litter pan at a depth of ½ to 3 inches.

The above composition is particularly useful as a cat litter for the following reasons. Urine has as it chief components water, salt and urea. It is the ammonia smell of urea that all commercially available cat litters seek to mask, neutralize or otherwise supress. Ammonia is given off as a gas whenever urine starts to chemically decompose, as it does shortly after discharge from all amimals. As stated previously, it is theorized that gypsum chemically reacts with urea to form the salt urea-sulfate, which does not chemically decompose at room temperature and pressure. Consequently, the odor of urine is eliminated, not by using fancy perfumes or masking agents, but by using gypsum.

Because the cat litter is pelletized, it is trackless, dustless and flushable (pellets don't possess the tendency to clog like toilet paper). Conventionally, pelletizing would be undesirable in most cat litter applications because the interior of the pellets are not contacted with and exposed to the animal waste. Consequently, most cat litter is in the form of a fine powder (which is why they are dusty and track-up the home), which increases the surface area of the absorbent and other materials, so that more of the cat litter contacts the waste and thus it is utilized to its utmost efficiency.

However, pelletizing is not a detriment to the present invention. In addition to the desirable characteristics of trackless, dustless and flushability, which pelletizing achieves, the present invention possesses a characteristic which overcomes the prior art problems of inefficient surface contact between the interior of the prior art pellets and the animal waste.

Urea has the characteristic of softening paper when contacted with it. Hence, as the animal uses the cat litter, pellets soften, expand and expose the fresh interior of the pellet so that more absorbent and gypsum will contact the waste.

As the pellet expands, the physical characteristics of the pellets change, such that they become more flushable in the toilet. This results directly from the fact that the pellets absorb approximately twice their own weight of animal urine, giving the pellets a density more like that of water itself (urine is approximately 95% water), so that the pellets flow more easily with the water in the toilet when the toilet is flushed.

Another feature of the present invention is that paper, which comprises 60 to 94% of the invention is completely biodegradable. Thus, upon arrival of the pellets at a sewage treatment plant, the pellets have generally completely disintegrate in the sewage water.

PLANT MULCH

The composition may be employed as a plant mulch by mixing it with soil, particularly when paper is the sole absorbent. The paper in the composition acts as a moisture retainer to maintain adequate moisture to the plant during periods between watering or raining. Furthermore, the paper is penetrable by the roots of plants, which allows the plants to obtain the mineral calcium sulfate (gypsum). Also, gypsum has the ability to neutralize alkaline soil, particularly alkali carbonates, since it is slightly acidic. Lastly, because the composition is biodegradable, it completely disintegrantes into the mineral and basic organic components.

GREASE AND OIL ABSORBENT

The composition is also useful as an absorbent of grease and oil by spreading the composition on the oil and/or grease. In this use, the preferred absorbent is paper because it appears to absorb more grease and oil than clay. While paper absorbs the oil and grease, the mineral gypsum, which is slightly acidic, acts as a mild acid cleaner to aid in substantially totally removing the oil or grease.

What is claimed is:

1. A composition which is useful as a cat litter comprising about 60-94% by weight paper as an absorbent, about 1-35% by weight gypsum as a neutralizing agent, and about 3-12% by weight water.

2. The composition of claim 1, wherein said paper comprises about 80-94% by weight and said gypsum comprises about 1-7% by weight.

3. A method of making a cat litter composition comprising:
   a. mixing shredded or powdered paper with 3-12% by weight water and 1-35% by weight gypsum until substantial uniformity is achieved, and
   b. pelletizing the mixed paper, gypsum and water.

4. The method of claim 3, wherein the water includes sufficient soap to maintain the pellets in pelletized form.

5. A composition useful as a cat litter comprising about 60-90% absorbent comprising one or more of clay and paper, about 1-35% by weight gypsum and about 3-12% by weight water.

6. The composition of claim 5, wherein the absorbent is clay.

7. The composition of claim 5, wherein the absorbent is clay and paper.

* * * * *